United States Patent [19]

Hansen

[11] Patent Number: 5,391,293

[45] Date of Patent: Feb. 21, 1995

[54] FILTERED WATER DISPENSING APPARATUS

[75] Inventor: George M. Hansen, Medina, Minn.

[73] Assignee: Water Horse Inc., Golden Valley, Minn.

[21] Appl. No.: 52,427

[22] Filed: Apr. 23, 1993

[51] Int. Cl.$^6$ ............................................ B01D 35/30
[52] U.S. Cl. ................................. 210/109; 194/350;
   210/232; 210/248; 222/173; 222/189; D20/1;
   D20/5
[58] Field of Search .............. 210/109, 232, 257.1,
   210/257.2, 258, 248; 222/173, 189, 108;
   220/DIG. 14, 529, 532, 541, 542; 194/250;
   D20/1, 4, 5; 428/36.6, 36.7; 259/282

[56] References Cited

U.S. PATENT DOCUMENTS

| D. 306,877 | 3/1990 | Guetat | D20/1 |
|---|---|---|---|
| D 341,746 | 11/1993 | Stillson | D20/4 |
| 3,207,281 | 9/1965 | Norris | D20/5 |
| 3,207,282 | 9/1965 | Norris | D20/5 |
| 3,856,676 | 12/1974 | Grimme et al. | 210/257.2 |
| 4,160,727 | 7/1979 | Harris | 210/259 |
| 5,096,095 | 3/1992 | Burton | 222/173 |
| 5,108,590 | 4/1992 | Disanto | 210/257.2 |
| 5,112,477 | 5/1992 | Hamlin | 210/257.1 |

FOREIGN PATENT DOCUMENTS 2096573 10/1982 United Kingdom ................ 222/173

Primary Examiner—Joseph W. Drodge
Attorney, Agent, or Firm—Roger W. Jensen

[57] ABSTRACT

Filtered water dispensing apparatus comprising an elongated hollow cylindrical seamless casing cut from an extruded PVC pipe having preselected inner and outer diameters, the casing being further characterized by having a longitudinal axis, an upper portion and a lower portion. An upper partition having a vertical central section and integral oppositely disposed top and bottom horizontally extending sections with the edges thereof being shaped to fit with the preselected inner diameter is removably mounted within and is connected to the upper portion of the casing and supports a water spigot and also provides a horizontal surface for supporting a container to receive filtered water from the spigot.

18 Claims, 4 Drawing Sheets

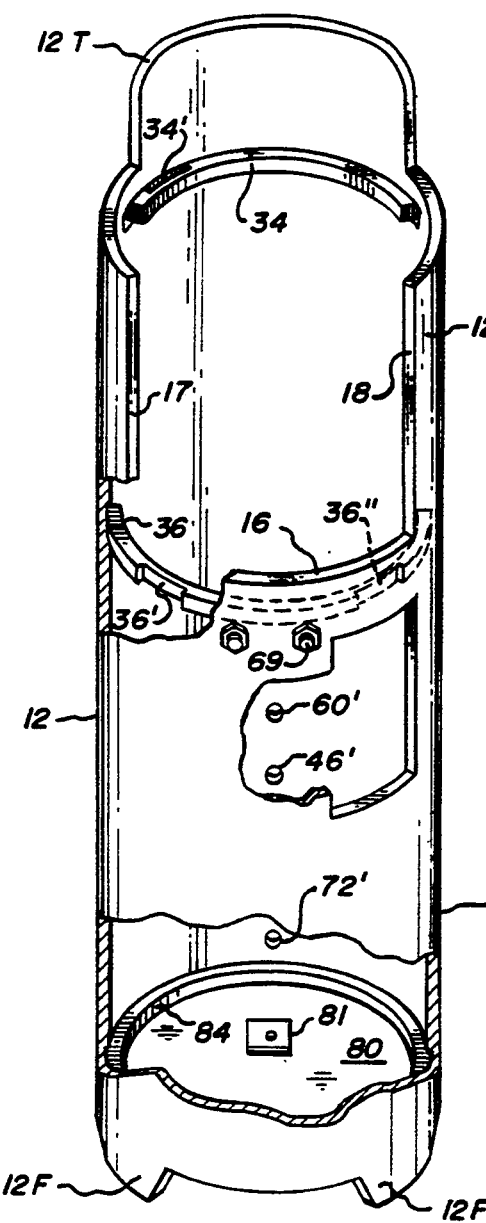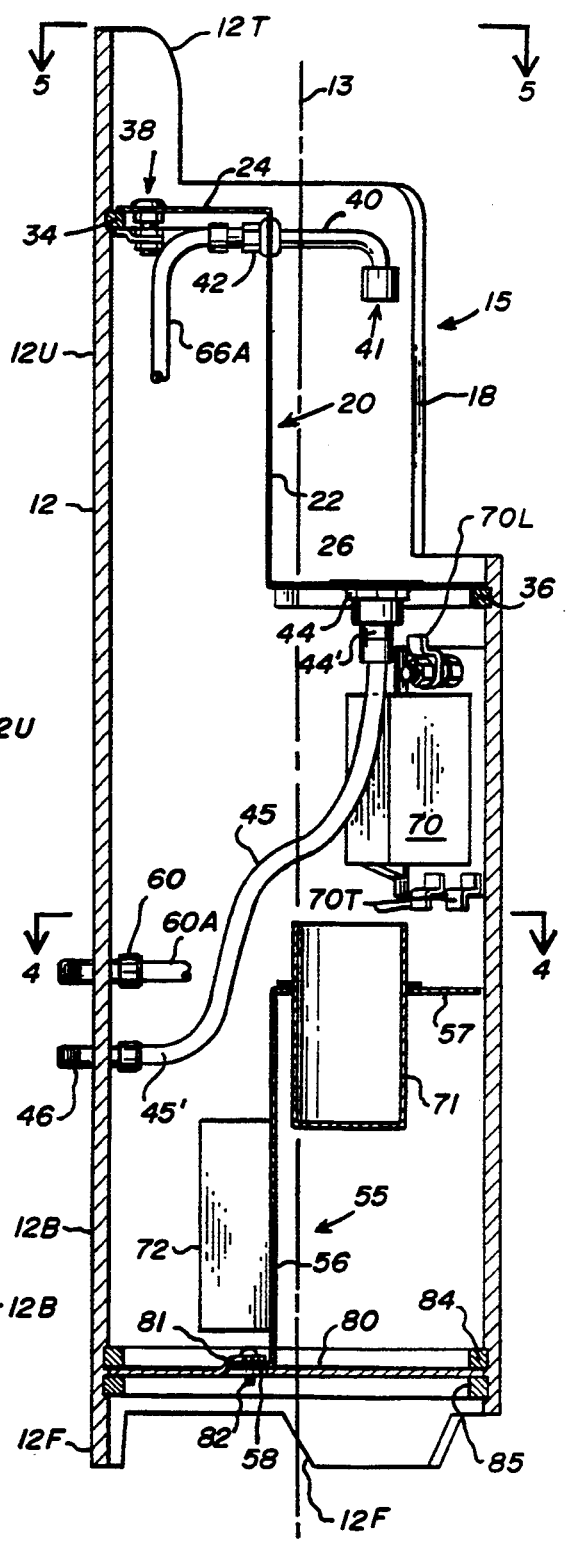
FIG. 2
FIG. 3

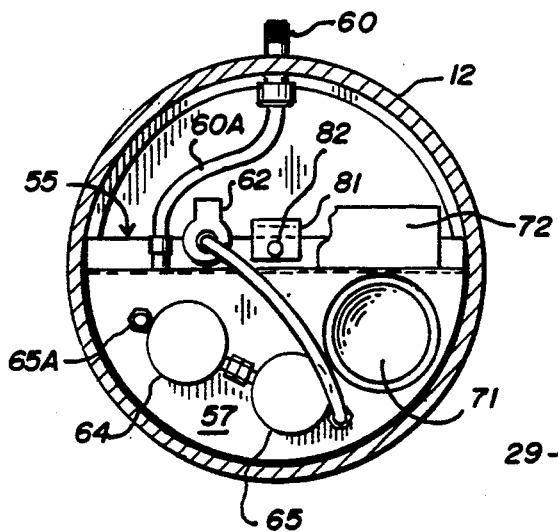
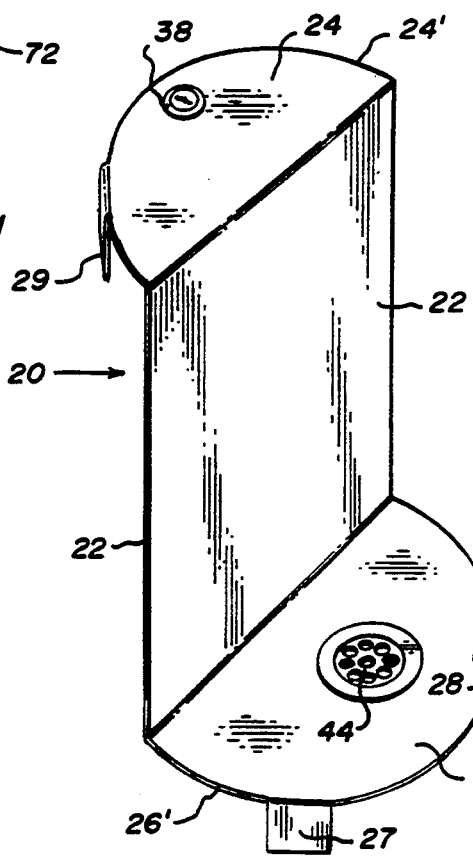
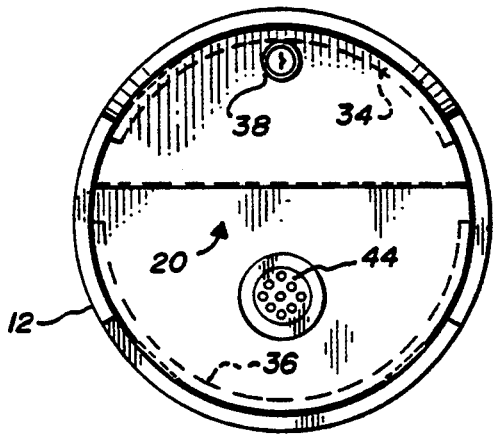
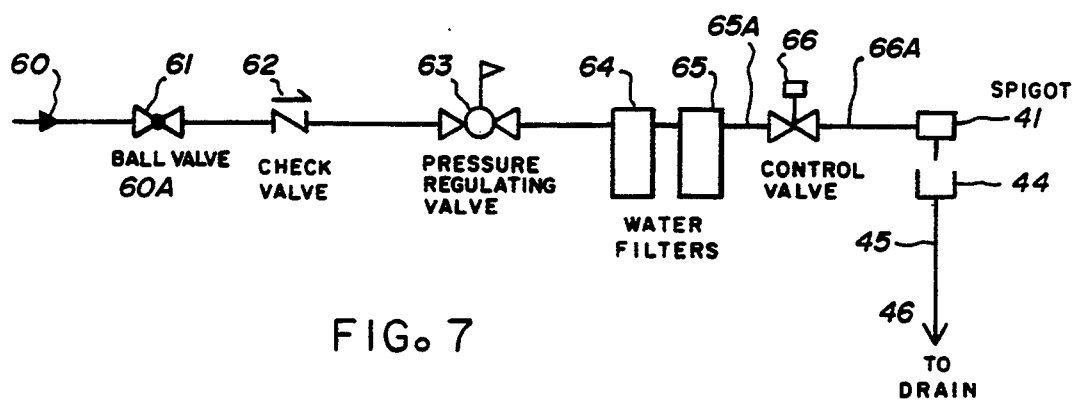

FILTERED WATER DISPENSING APPARATUS

FIELD OF THE INVENTION

This invention relates to the field of machines which can be selectively controlled to dispense filtered water. More specifically my invention is directed to an inexpensive-to-manufacture, attractive and compact filtered water dispenser. Dispensers utilizing my invention will typically be provided at locations truly convenient for filtered water users, i.e., consumers.

BACKGROUND OF THE INVENTION

Point of sales coin operated filtered water dispensers are well known. They are large, heavy, unattractive and expensive, attributes that greatly limit the utilization and profit ability thereof. Such machines are found, if at all, at only very selective "high traffic" locations such as supermarkets.; Purchasers travel from their homes to such locations, bringing with them an empty container(s). Money is inserted into the machine and filtered water is dispensed into the containers.

SUMMARY OF THE INVENTION

My invention provides a relatively light weight, compact and attractive filtered water dispenser. The constructional features of the invention provide not only the aforementioned attributes but also allows a very low manufacturing cost and selling price. It permits a vast enlargement of the market for filtered water dispensers; they may be profitably utilized at locations which previously could not be served by the expensive, bulky and heavy prior art dispensers. Dispensers utilizing my invention may be placed at locations (i) much more convenient for the ultimate filtered water consumer, e.g., at multi-housing complexes such as apartment buildings, and (ii) where the prior art dispensers have heretofore not been utilized because of the aforementioned characteristics of size, weight, general unattractiveness and high cost.

BRIEF DESCRIPTION OF THE DRAWINGS

FIG. 2 is a perspective view, partly cut away, of the casing or housing of the dispenser;

FIG. 3 is a longitudinal cross-sectional view of the casing as viewed from the left side of the dispenser of FIG. 1;this figure also depicts equipment contained within the casing;

FIG. 4 is a view of the casing as viewed along section lines 4—4 of FIG. 3;

FIG. 5 is a view of the dispenser of the prior figures as viewed along section lines 5—5 of FIG. 3;

FIG. 6 is a perspective view of the upper partition of the dispenser;

FIG. 7 is a water schematic of the apparatus; and

DETAILED DESCRIPTION OF PREFERRED EMBODIMENT

Figure 1:
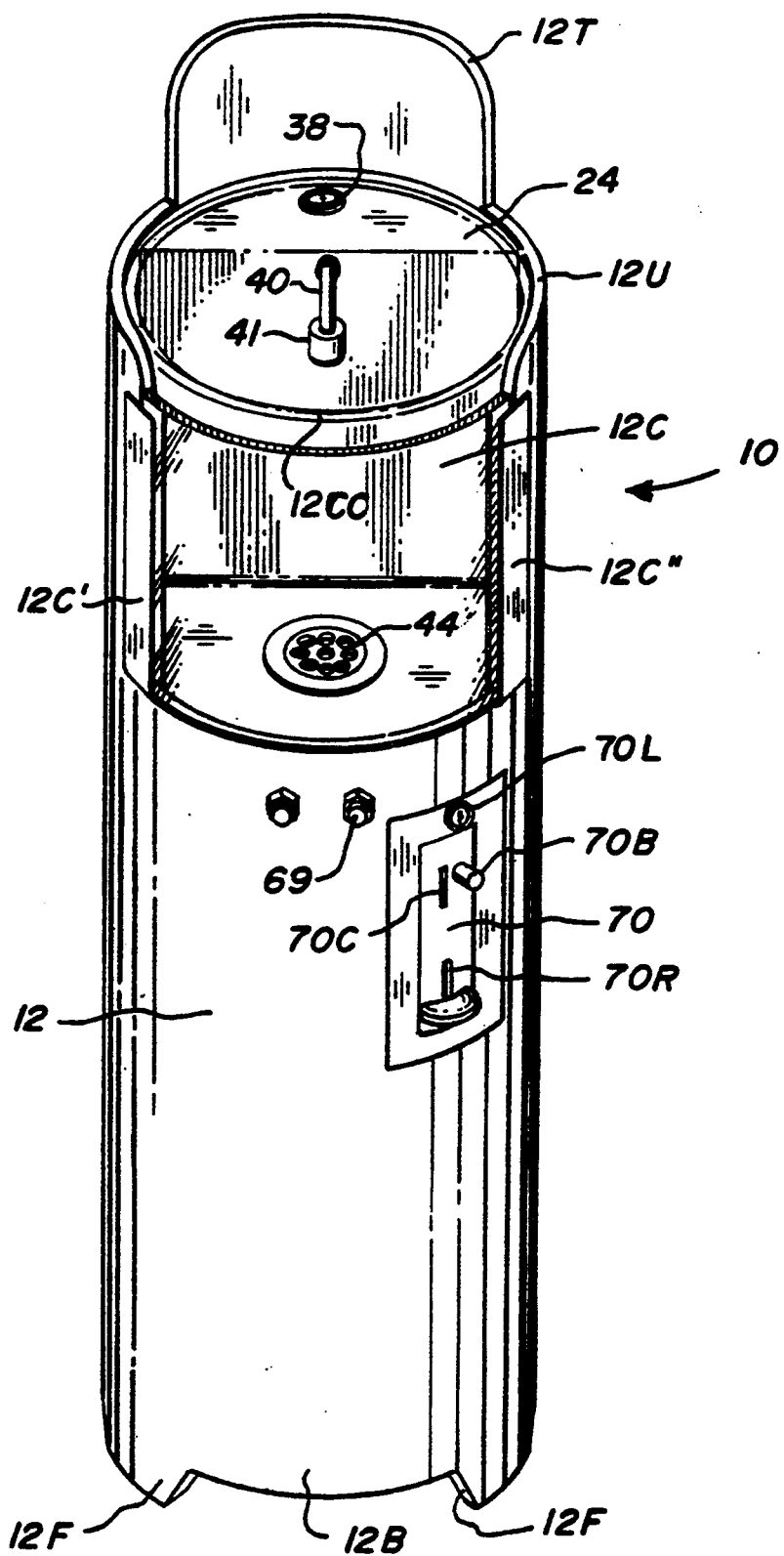
FIG. 1 is a perspective view of a filtered water dispenser utilizing my invention.

In FIG. 1 the reference numeral 10 designates a filtered water dispenser using my invention. The dominant component of the dispenser 10 is an elongated hollow cylindrical seamless casing 12 having a longitudinal axis or center line 13, a preselected longitudinal length, an upper or top portion 12U, and a lower or bottom portion 12B.

Figure 8:
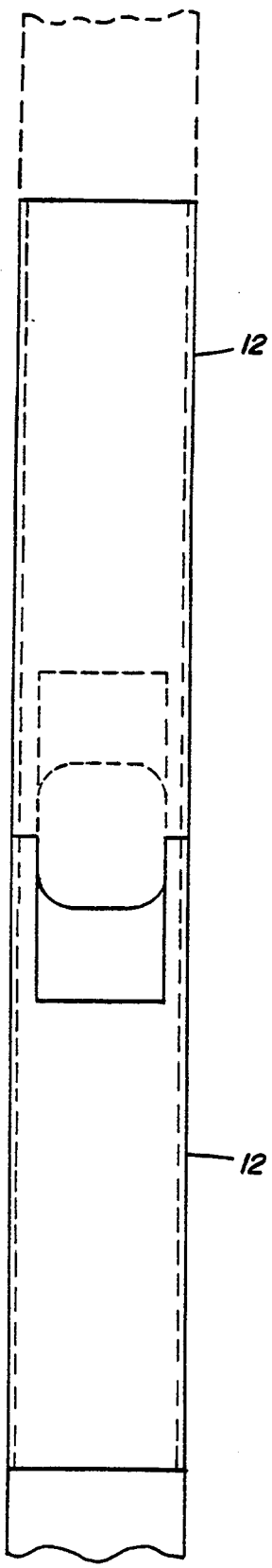
FIGS. 8 and 9 show views of the initial forming of the casings by the cutting of sections from a relatively long length of PVC pipe.
Figure 9:
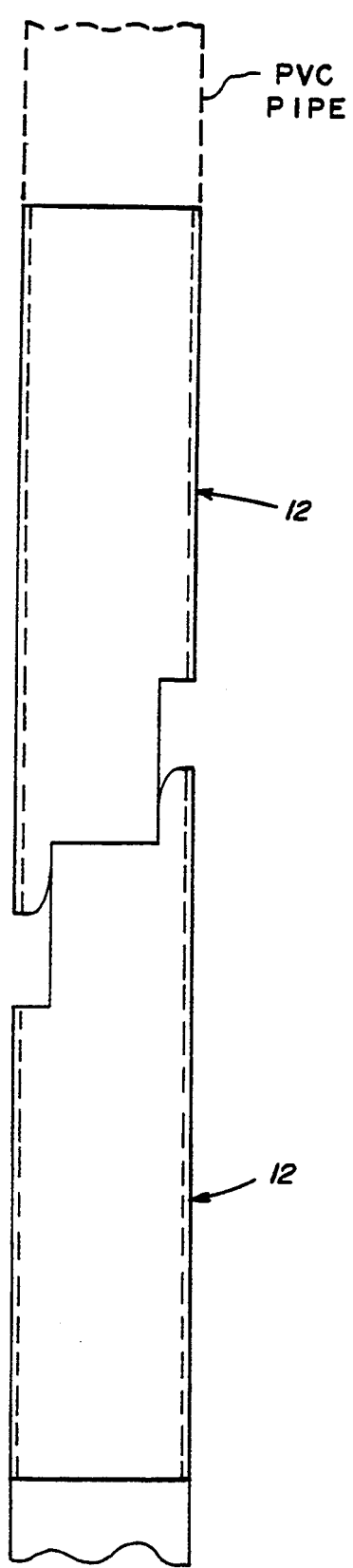

Each casing 12 is preferably fabricated by being a section cut from a relatively long length of extruded PVC (polyvinyl chloride) pipe; see FIGS. 8 and 9. One PVC pipe that is satisfactory is supplied by Northwest Tubing Co., Fargo, N.D. and having a nominal outer diameter of 14.91 inches and an inner diameter of 14.5 inches to thereby provide a nominal wall thickness of 0.41 inches. The aforesaid inner and outer diameters and wall thickness of the casing are especially well shown in FIGS. 4 and 5. It also will be understood that commercial extruded PVC pipe is available in several sizes, i.e., diameters, thickness, and color; it inherently is seamless and both outer and inner surfaces are relatively smooth. The surfaces may be painted or have special coatings or coverings if desired. The exterior of the pipe as received from the pipe factory is, for some applications, quite attractive. The casing 12 has at the upper end 12U a container opening 15 with a bottom horizontal curved edge 16 and parallel vertical edges 17 and 18.

The dispenser 10 has an upper partition member 20 of sheet metal or other suitable material shown in FIG. 6 having a vertical central section 22 and integral oppositely disposed top and bottom horizontally extending sections 24 and 26 respectively. The plane of the vertical section 22 is parallel to and (preferably) spaced from axis 13 a preselected amount to thereby permit bottom section 26 to be of sufficient size to receive and to serve as a support for a water container (not shown).

The outer edges 24' and 26' of horizontal sections 24 and 26 respectively are preferably curved or shaped to fit snuggly within the inner diameter of the casing 12, provided however the entire upper partition member 20 is removably mounted in casing 12 as will be discussed below. To this end a pair of tabs 27 and 28 depend down from section 26 and a tab 29 depends down from section 24.

An upper support shoulder 34 is provided on the inner surface of casing near the top 12U thereof and is shown in FIGS. 2,3 and 5. Shoulder 34 is disposed opposite from opening 15; it extends horizontally and arcuately around a preselected portion of the inner surface of casing 12; a slot 34' in shoulder 34 is adapted to receive tab 29.

An intermediate support shoulder 36 is provided on the inner surface of casing 12 slightly below (toward the bottom 12B) edge 16 of container opening 15 and is also shown in FIGS. 2,3 and 5. Shoulder 36 is disposed proximate opening 15, extending horizontally and arcuately a preselected portion of the inner surface of casing 12 to provide a load bearing support for horizontal section 26 of partition member 20. A pair of slots 36' and 36" are provided in shoulder 36; they are sized and located to receive, respectively, the tabs 27 and 28 of section 26.

The partition member 20 is thus supported by shoulders 34 and 36. The tabs 27, 28 and 29, when engaged in their cooperative slots 36', 36", and 34', respectively, prevent any rotation of member 20 about longitudinal axis 13.

A lock means 38 is mounted on horizontal section 24 adjacent to shoulder 34; it may be operated (i) to a locked mode whereat removal of the partition member 20 from the casing is prevented, or (ii) to an unlocked mode to permit selective removal of member 20.

A water spigot means 40 is mounted on vertical section 22 near the top thereof as best shown in FIG. 3; it has a dispensing end or spigot 41 and a supply end 42.

Fluid drain means 44, if desired, is provided in the horizontal section 26 to drain off any spillage of water; a drain hose or pipe 45 is connected at one end to a coupling means 44' and has another end 45' connected to a drain fitting 46.

A lower partition member 55 of sheet metal or other suitable material having a vertical section 56 and integral oppositely disposed top and bottom horizontally extending sections 57 and 58 is adapted to be positioned in the lower or bottom portion 12B of the casing 12. The support means for the partition member 55 is a bottom plate 80, shown to be of circular shape, which is held in position by being sandwiched between a pair of annular shoulders 84 and 85 near the very bottom of casing 12. The circular shaped plate 80 has an integral bracket 81 for receiving and holding the bottom horizontal section 58 which is secured in place by suitable means such as a screw 82, shown best in FIG. 3. A coin can 71 is removably mounted in a suitable aperature in the top horizontal section 57 of member 55. A control package 72 is mounted on the vertical section 56 of member 55; control package 72 contains the required electrical and electronic components that; provide the safety and timing functions for actuating the water control valve 66 to be discussed below, the specific details of the electronics are not critical to the present invention, those skilled in the art being familiar with the various alternative arrangements of using counters, count switches, switching relays, timing relays, all in connection with an appropriate fused power supply and a starting switch 69 mounted on the case 12 as shown in FIGS. 1 and 2.

A coin receiving and controlling unit 70 is mounted in the mid-section of casing 12 so as to be vertically disposed above the coin can 71. A number of such units are commercially available; a unit which has been found appropriate is sold by COINCO, St. Louis, Mo. The coin unit is shown to have a coin receiving slot 70C, a push button 70B for coin return and a coin return slot 70R. Accepted coins are dispensed into and stored in coin can 71. The unit 70 is held in place at the bottom thereof by a pair of tabs 70T coacting with the casing 12 and at the top by a lock means 70L. The lock means 70L permits the selective removal (temporarily) of the unit 70 to permit removal of accumulated coins from the coin can 71.

Referring to FIG. 7, the water piping schematic of the dispenser apparatus, it is seen that the flow path starts at the left of the figure with the water supply means 60 connected via piping/tubing 60A to a ball valve 61, check valve 62, pressure regulating valve 63 to a pair of water filters arranged in series 64 and 65. The water filters are standard commercially available units; units that I have found satisfactory are those supplied by COINCO, St. Louis, Mo. The output from water filter 65 is connected by piping 65A to a control valve 66 which is controlled by the aforementioned electrical control circuit contained in part in the control package 72; when actuated, permits flow of filtered water from the filter 65 via piping/tubing 66A to the spigot means 40.

The top of the casing 12 may include, if desired, a longitudinally extending sector 12T which provides the functions of decor, and a space for messages, company names and logos, etc. The bottom of the casing 12 may be a continuous coplanar cut or, as in the preferred embodiment depicted, provided with cutout portions designing three foot-like portions 12F.

An optional item for the dispenser is a transparent cover 12C which is vertically, movably mounted adjacent to the container opening 15 and is shown in FIG. 1; it is supported on the bottom by horizontal section 26 of partition 20 and is positioned by a pair of guide members 12C' and 12C''. Thus, the user of the filtered water dispensing apparatus may raise temporarily the cover 12C prior to inserting the water container (not shown) to be filled from the spigot 41. Also, if desired, a top transparent or opaque cover 12CC may be placed over the spigot 40.

Appropriate openings 60', 46', and 72' (shown in FIG. 2) are provided, respectively, for the water inlet 60, the drain 46 and electric power for the control package 72.

The shoulders 34, 36, 84 and 85 are preferably made of the same material as the casing 12; frequently scrap material remaining from the cutting of the casings 12 from the pipe can be used for forming such shoulders. The shoulders preferably are positioned in circumferential (partial or full) slots or recesses cut into the inner periphery of the casing 12 as shown clearly in FIG. 3. Alternately the shoulders may be bonded directly to the inner periphery of casing 12 without the recesses. In either case, an appropriate adhesive such as the Oatey Company PVC plastic pipe glue may be used to bond the shoulders to the casing 12.

One control package that may be used for the ;controlling of the control valve 66 is Vikland Company, Part No. SSAC.

The upper partition member 20 can be removed, as required, by service personnel to collect accumulated coins, and to service the water filters 64 and 65 or other components of the apparatus.

The embodiments of the invention in which an exclusive property or right is claimed are defined as follows:
1. Filtered water dispensing apparatus comprising:
   a) an elongated hollow cylindrical seamless casing having a preselected longitudinal length, said casing being a section cut from a relatively long length of extruded PVC pipe having preselected inner and outer diameters,, said casing being further characterized by having a longitudinal axis, an upper portion and a lower portion;
   b) an upper partition member having a vertical central section and integral oppositely disposed top and bottom horizontally extending sections with thee edges thereof being shaped to fit with said preselected inner diameter, said upper partition member being removably mounted within and connected to said upper portion of said casing;
   c) water spigot means connected to said vertical section and having a dispensing end and a supply end;
   d) a lower partition member having a vertical section and integral oppositely disposed top and bottom horizontally extending sections, said lower partition member being fixed within said lower portion of said casing;
   e) water filtering means mounted on said lower partition member and having a filtered water outlet and an inlet adapted to receive unfiltered water;
   f) means connecting said outlet to said supply end of said water spigot means; and
   g) manually actuated control means for controlling the flow of filtered water through said water spigot means.

2. Apparatus of claim 1 further characterized by said casing having a container opening adjacent the top end of said upper portion to permit passage therethrough of a bulk fluid container.

3. Apparatus of claim 2 further characterized by said upper partition member being positioned in said casing so that said bottom horizontally extending section thereof is symmetrical with, adjacent to and below said container opening.

4. Apparatus of claim 3 being further characterized by said edges of said upper partition member being curved to match and fit against the inner surface of said casing.

5. Apparatus of claim 4 being further characterized by said top and bottom horizontally extending sections including at the outer peripheries thereof casing connection means.

6. Apparatus of claim 5 being further characterized by said casing having, on the inner surface thereof, support means for receiving and longitudinally supporting said upper partition member said casing connection means engaging said casing support means and including means to prevent rotation of said upper partition member with respect to said casing about said longitudinal axis.

7. Apparatus, of claim 6 further characterized by said upper portion of said casing and said upper partition member having selectively manually operative means for locking said upper partition member to said casing.

8. Apparatus of claim 3 further being characterized by said bottom horizontally extending section including fluid drain means.

9. Apparatus of claim 1 further characterized by said inner and outer diameters being preselected to provide a wall thickness of said casing which provides preselected strength and weight.

10. Filtered water dispensing apparatus comprising:
 a) an elongated hollow cylindrical seamless casing having a preselected longitudinal length, said casing being a section cut from a relatively long length of extruded PVC pipe having preselected inner and outer diameters, said casing being further characterized by having a longitudinal axis an upper portion and a lower portion;
 b) an upper partition member having a vertical central section and integral oppositely disposed top and bottom horizontally extending sections with the edges thereof being shaped to fit with said preselected inner diameter, said upper partition member being removably mounted within and connected to said upper portion of said casing;
 c) water spigot means connected to said upper partition member and having a dispensing end and a supply end;
 d) water filtering means mounted in said lower portion of said casing and having a filtered water outlet and an inlet adapted to receive unfiltered water;
 e) means connecting said outlet to said supply end of said water spigot means; and
 f) manually actuated control means for controlling the flow of filtered water through said water spigot means.

11. Apparatus of claim 10 further characterized by said casing having a container opening adjacent the top end of said upper portion to permit passage therethrough of a bulk fluid container.

12. Apparatus of claim 11 further characterized by said upper partition member being positioned in said casing so that said bottom horizontally extending section thereof is symmetrical with, adjacent to and below said container opening.

13. Apparatus of claim 12 being further characterized by said edges of said upper partition member being curved to match and fit against the inner surface of said casing.

14. Apparatus of claim 13 being further characterized by said top and bottom horizontally extending sections including at the outer peripheries thereof casing connection means.

15. Apparatus of claim 14 being further characterized by said casing having, on the inner surface thereof, support means for receiving and longitudinally supporting said upper partition member, said casing connection means engaging said casing support means and including means to prevent rotation of said upper partition with respect to said casing about said longitudinal axis.

16. Apparatus of claim 15 further characterized by said upper portion of said casing and said upper partition member having selectively manually operative means for locking said upper partition member to said casing.

17. Apparatus of claim 12 further being characterized by said bottom horizontally extending section including fluid drain means.

18. Apparatus of claim 10 further characterized by said inner and outer diameters being preselected to provide a wall thickness of said casing which provides a preselected strength and weight.

* * * * *